E. L. BUSHNELL.

Spring Mattress.

No. 4,103. Reissued Aug. 23, 1870.

Witnesses:

Phil. T. Dodge.

E. J. Sommer.

Inventor:

E. L. Bushnell.

by Dodge & Munn.

his attys.

N. PETERS, Photo-Lithographer, Washington, D. C.

United States Patent Office.

EDWIN L. BUSHNELL, OF POUGHKEEPSIE, NEW YORK.

*Letters Patent No.* 95,984, *dated October* 19, 1869; *reissue No.* 4,103, *dated August* 23, 1870.

IMPROVED SPRING MATTRESS.

The Schedule referred to in these Letters Patent and making part of the same

*To all whom it may concern:*

Be it known that I, EDWIN L. BUSHNELL, of Poughkeepsie, in the county of Dutchess and State of New York, have invented certain new and useful Improvements in Spring Mattresses; and I do hereby declare that the following is a full, clear, and exact description thereof, reference being had to the accompanying drawing making part of this specification, and to the letters of reference marked thereon, like letters indicating like parts wherever they occur.

To enable others skilled in the art to construct and use my invention, I will proceed to describe it.

My invention relates to spring-beds; and

It consists—

First, in constructing the springs of wire, with eyes or loops, formed by bending or twisting the wire that forms the spring in such a manner that the spring, with its eyes or loops, shall all be made of a single continuous piece of wire, and the eyes or loops be arranged to hold in place the cord or other material used for uniting a series of the springs, to form a bed-bottom or mattress; and It further consists in the uniting a series of springs in a novel manner, whereby a complete mattress or spring-bed bottom is produced, all as hereinafter more fully explained.

Figure 1:
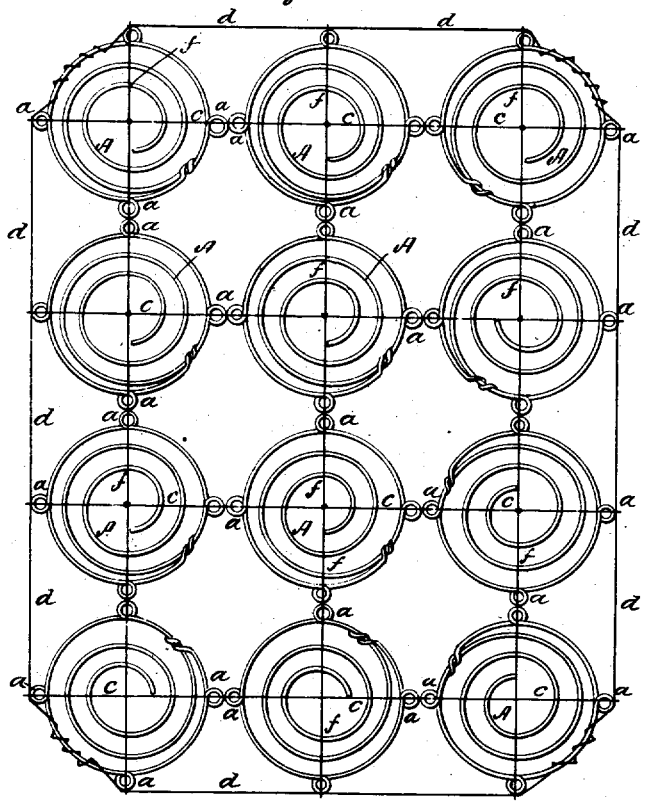
Figure 2:
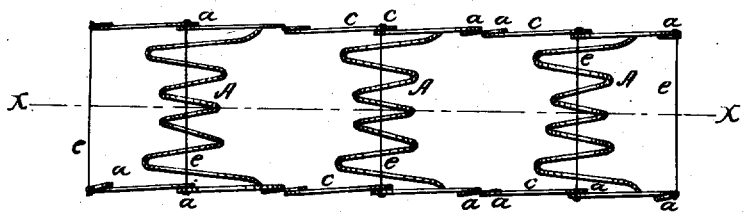

Figure 1 is a top plan view of a horizontal section on line *x x* of fig. 2, and Figure 2 is an end elevation of a mattress complete.

Various attempts have heretofore been made, by myself and others, to construct a spring-bed by uniting, side by side, a series of spiral springs, the springs being connected together by means of cords, wire, or similar devices.

In order to afford means of attaching the cords to the springs, and keep them in their proper position, it was necessary to provide the springs with eyes or loops, to which the cords were to be fastened, but in all cases these eyes or loops were made of separate or detached pieces, and then fastened to the springs by twisting or bending their ends around the wire of the spring, or by soldering them to the spring.

Both of these plans were expensive, and all failed to operate satisfactorily, for the reason that, when secured loosely by bending or twisting, the eyes or loops would not retain their proper position, but would slip out of place, and when secured by soldering them to the springs, they were constantly becoming detached; especially did these difficulties occur when the mattress was rolled or doubled up for transportation, or was bent or doubled in the ordinary handling or turning of it in use.

My present invention has for its object the remedying of these difficulties, and, thereby, the producing of a more perfect and useful spring-bed or mattress.

To accomplish these objects, I make a spring with eyes or loops on each end coil, by so bending or twisting the wire at those points as to form the eyes or loops in the same piece of wire that constitutes the spring, as represented in fig. 1.

The springs may be made of any suitable form, though I prefer to make them in the form of two truncated cones, united at their smaller ends, as represented in fig. 2, for the reason that it takes less metal, and because, also, the springs are less liable to interlock with each other when the mattress is doubled, rolled, or bent.

In the present case I form the eyes *a* at four points equidistant from each other, in the outer end coil of the spring, at each end thereof, as shown in fig. 1, the eyes being formed by a single twist in the wire, at the required points.

It is immaterial what the form or shape of the eye or loop is, and it may be made by either twisting or bending the wire, the sole requisite being that it shall be of such form or shape as to prevent the cord from slipping out of place, and be formed of the same piece that constitutes the spring itself, the function of these eyes or loops being simply as a means of securing the springs to each other and prevent the fastenings from becoming deranged.

Across the upper and lower ends of each row of springs I stretch cords *c*, and at right angles to the cords *c*, but also across the ends of the springs, I stretch cords *f*.

By means of these cords I tie the adjoining eyes of adjacent springs tightly together, and I also knot the cords *c* and *f* together wherever they cross each other at the centers of the springs, as shown in fig. 1.

The top and bottom eyes, on the outside of each of the outer springs, I connect by a cord, *e*, as shown in fig. 2.

I also connect the outside eyes at the top of all the springs by a cord, *d*, as shown in fig. 2, and the corresponding eyes at the bottom of the outside springs by a cord, *d'*, as shown in fig. 1.

When the springs are thus arranged, they form a light, strong, and elastic spring mattress, which can be used on an ordinary bedstead, without altering or changing the same in any way.

This mattress does not lose its form by use, nor do the springs become bent out of shape, as frequently happens in bed-bottoms, as, by my method of connecting the springs, weight cannot be applied to any one of them singly.

When weight or strain is applied to any one of the series of springs, the spring being closely connected to the adjoining springs, the weight is distributed over several springs.

My principle of construction may be applied, not only to mattresses, but to pillows, cushions, &c., the cords *e* being shortened in those cases, to give the article a rounded form on the edges.

When my mattress is to be stored or transported, it can be rolled up either crosswise or lengthwise, into a compact and convenient form, and it will, upon being released, immediately resume its original form.

This mattress is cheaper, lighter, and more elastic than the bed-bottoms in which wooden slats are used, and, unlike them, it affords no protection for vermin.

It is obvious that there are many ways in which the cords may be connected, beside the one shown, the main object being only to so connect the eyes of the springs as to hold the latter firmly in position.

Having thus described my invention,

What I claim is—

1. A spring for beds, having eyes or loops formed thereon, by bending or twisting the wire of the spring, substantially as described.

2. A spring mattress, consisting of a series of springs, A, with eyes or loops *a*, united by cords *c* and *f*, as described.

EDWIN L. BUSHNELL.

Witnesses:

JAMES H. CRONK,
M. M. VINCENT.